United States Patent
Liu

(10) Patent No.: US 8,723,433 B2
(45) Date of Patent: May 13, 2014

(54) POWER TRANSFORMATION APPARATUS BETWEEN DC LIGHT ELEMENT AND BALLAST

(71) Applicant: Geometek Application Engineering Co., Ltd., Jhubei (TW)

(72) Inventor: Yung-Cheng Liu, Zhubei (TW)

(73) Assignees: Geometek Application Engineering Co., Ltd., Zhubei (TW); Yung-Cheng Liu, Zhubei (TW)

( * ) Notice: Subject to any disclaimer, the term of this patent is extended or adjusted under 35 U.S.C. 154(b) by 0 days.

(21) Appl. No.: 13/735,077

(22) Filed: Jan. 7, 2013

(65) Prior Publication Data

US 2014/0021873 A1    Jan. 23, 2014

(30) Foreign Application Priority Data

Jul. 17, 2012   (TW) .............................. 101125640 A

(51) Int. Cl.
    *H05B 37/00*   (2006.01)
(52) U.S. Cl.
    USPC ........................ 315/200 R; 315/224; 315/291
(58) Field of Classification Search
    USPC .............. 315/185 R, 200 R, 209 R, 224–226, 315/244–246, 291, 307, 308
    See application file for complete search history.

(56) References Cited

U.S. PATENT DOCUMENTS

| | | | |
|---|---|---|---|
| 7,911,149 B2* | 3/2011 | Schaible et al. | ............... 315/224 |
| 2009/0026973 A1 | 1/2009 | Kato et al. | |
| 2009/0303720 A1 | 12/2009 | McGrath | |
| 2011/0043127 A1* | 2/2011 | Yamasaki | ..................... 315/291 |
| 2011/0043136 A1 | 2/2011 | Radermacher | |
| 2012/0068604 A1 | 3/2012 | Hasnain et al. | |

* cited by examiner

*Primary Examiner* — Jimmy Vu
(74) *Attorney, Agent, or Firm* — Alan Kamrath; Kamrath IP Lawfirm, P.A.

(57) ABSTRACT

A power transformation apparatus between DC light element and ballast includes a first fluorescent emulation module, a second fluorescent emulation module and a rectifier module; wherein the first fluorescent emulation module includes two input current terminals for electrically connecting to first set of AC output terminals of the ballast, the second fluorescent emulation module also includes two input current terminals for electrically connecting to second set of AC output terminals of the ballast; two input terminals of the rectifier module are electrically connected respectively to any output terminal of first set of AC output terminals and second set of AC output terminals. The rectifier module outputs a rectified DC to supply to the DC light element as a power source.

9 Claims, 2 Drawing Sheets

POWER TRANSFORMATION APPARATUS BETWEEN DC LIGHT ELEMENT AND BALLAST

FIELD OF THE INVENTION

The present invention relates to a power transformation apparatus; particularly, to a power transformation apparatus between a DC light element and a ballast, and is suitable for an existing lighting apparatus having a ballast, to convert electrical energy into a power source which can be directly supplied to the DC light element.

BACKGROUND OF THE INVENTION

Due to the issues of energy resources and global climate change, and to promote the development of green energy and other alternative energy sources, the application of high-performance light source becomes more and more important. Therefore, recently the light-emitting diode (LED) used as the replacement of the existing fluorescent tubes has attracted more discussion options and become important applications. An electronic ballast with a high power factor (PF) or a traditional magnetic steel sheet ballast which needs a starter are severed as the power source of a fluorescent tube, however, the power source provided by the ballast can not be used directly on the DC light element, e.g., an LED. Therefore, a power transformation apparatus is required, for appropriate converting the power source supplied by the ballast, so as to provide the converted power source to the DC light elements such as the LED.

The ballast is an electrical apparatus, used for overcoming the negative-resistance characteristics of the gas-discharge light source, to make the gas-discharge light source to work successfully.

The gas-discharge light source, due to its discharge mechanism, usually has a negative-resistance characteristic in its normal working area: that is, as the current increases, the voltage decreases; vice versa. Therefore, if a gas-discharge lamp is connected to the voltage source directly, the gas-discharge lamp will be burned due to the current increased rapidly and exceeded the limit; the ballast hence must be used in series in the circuit to limit the current. Conventionally, the traditional ballast is an inductor formed by enameled wires entwined to an iron-core, and usually a starter is also needed to be used in conjunction with. On the other hand, the increasingly mature electronic ballast also gradually replaces the traditional inductive ballast.

The electronic ballast refers to the electronic apparatus which uses electronic technology to drive the electric light source, to produce the desired lighting. Because of its compact and lightweight, and the electronic ballast even can be integrated with the tube, more and more fluorescent tubes using electronic ballasts. The electronic ballast also has other functions, for example, by increasing the current frequency or changing the current waveform (e.g., into square waves), the discomforting flickers from the fluorescent tubes can be reduced or eliminated. Besides, the electronic ballast has a high power factor, which is higher than 0.95. In addition, other advantages of the electronic ballast include low-energy, small heat which can reduce the loading of the circuit and power consumption; low-noise, high-quality electronic ballast can has a noise under 35 db; the gas-discharge tube can be started successfully once when the gas-discharge tube is preheated, to avoid starting repeatedly, thereby extends the life of the gas-discharge tube; instant started without blinking, starter free; radiation is more stable, to help improving the visual resolution, to improve the effectiveness and reduce visual tiredness due to continuous operations, thereby help to protect human eyesight. In addition, the electronic ballast also maintains a constant power of the light source even if the large power/voltage deviation, to thereby keep a stable illumination, and is conducive to energy conservation. Therefore, the electronic ballasts have been widely used, and are gradually replacing magnetic steel sheet ballast which usually requires a starter.

As mentioned above, for promoting the energy efficiency of the fluorescent lighting, the electronic ballast having a high power factor has already replaced the magnetic steel sheet ballast (with a power factor about 0.65) which generally needs a starter; besides, since the LED with advantages such as good luminous efficacy and long usage life, the LED has become energy-saving light source. Therefore, it is a beneficial lighting scheme to use the electronic ballast with a high power factor in conjunction with the LED having a great lighting efficiency and a long usage life.

However, the output of the ballast is alternating current (AC), and the ballast is used to overcome the negative-resistance characteristics of the gas-discharge light source, so the ballast can not be connected directly to the LED that should be connected to a DC power source. In other words, an apparatus is needed to make the AC electric energy outputted from the electronic ballast to be converted as a valid and effective power source of the LED requiring a DC power source.

Recently, the main resolution of most methods is removing the electronic ballast, and using a power source converting module (AC to DC power module) to convert the applied AC power source to the DC power source; however, in this way, the usage life, efficiency and the cost are restricted due to the characteristics of the used elements, such as the switching elements (e.g., MOSFET), the output filter capacitor (e.g., the short life of the electrolyte of the electrolytic capacitor), and quality/size/cost issues of the transformer.

Therefore, it is an important issue to provide an apparatus and apply the apparatus in the existing lighting apparatus with the ballast. The apparatus can convert the electronic energy to the DC current for a DC lighting element, to make the provided apparatus can be worked with the various market-existing types of traditional or electronic ballast, and make the provided apparatus can be used to work with the power source supplied by a variety of ballasts without malfunction.

SUMMARY OF THE INVENTION

A main purpose of the present invention is to provide a power transformation apparatus placed between a DC light element and a ballast, which is suitable for an existing lighting apparatus with the ballast, to convert the electric energy to the power source suitable for the DC light element, and make the power transformation apparatus can be worked with various market-existing types of traditional or electronic ballast.

Another purpose of the present invention is to provide an emulating module which can emulate the electrical characteristics of a fluorescent tube when the fluorescent tube is used in a lighting apparatus with the ballast.

For achieving the purposes abovementioned, the present invention provides a power transformation apparatus, positioned between a DC light element and a ballast, the power transformation apparatus including: a first fluorescent emulation module, having two input current terminals, for respectively electrically connecting an output terminal of a first set of AC output terminals of the ballast; a second set of fluorescent emulation module, having two input current terminals, for respectively electrically connecting to an output terminal of a second set of AC output terminals of the ballast; and a rectifier module, having two input terminals, the two input terminals are electrically connected respectively to any input current terminal of the first fluorescent emulation module (i.e., any output terminal of the first set of AC output terminals of the ballast) and any input current terminal of the second fluorescent emulation module (i.e., any output terminal of the second set of AC output terminals of the ballast), and outputting a rectified DC, to supply to the DC light element as a power source.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

Figure 1:
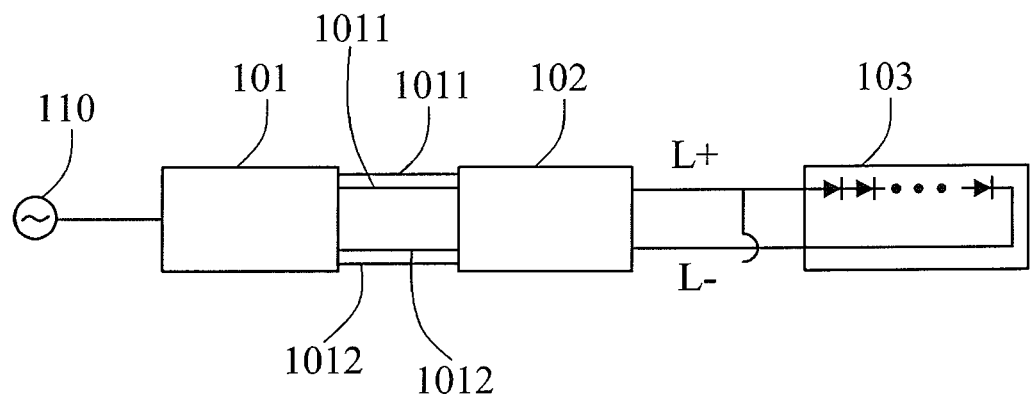
FIG. 1 is a block diagram illustrating the power transformation apparatus between DC light elements, a ballast, and an AC power according to an exemplary embodiment of the present invention.

Please refer to FIG. 1; FIG. 1 is a block diagram illustrating the power transformation apparatus between DC light elements, a ballast, and an AC power according to an exemplary embodiment of the present invention. As shown in FIG. 1, the power transformation apparatus 102 between a DC light element and the ballast of the present invention is positioned between ballast 101 and a DC light element 103; the ballast 101 is electrically connected to a AC power source 110, and the power transformation apparatus 102 having a first set of AC output terminals 1011 and a second set of AC output terminals 1012, to output the AC power source for supplying to a light source. Please note that since the outputs are AC power sources, each set of AC output terminals has two output terminals (i.e., two connecting lines), for providing the electrical connection to the load. In this exemplary embodiment, the load is a light source. The power transformation apparatus 102 between the DC light element 103 and the ballast 101 respectively electrically connecting to a first set of AC output terminals 1011 and a second set of AC output terminals 1012 of the ballast 101, and converts the inputs into DC power source outputs (e.g., L+ and L− shown in FIG. 1), for driving the DC light element 103 which is electrically connecting to the power transformation apparatus 102. In this exemplary embodiment, the DC light element 103 is a luminary constructed by at least a LED.

Figure 2:
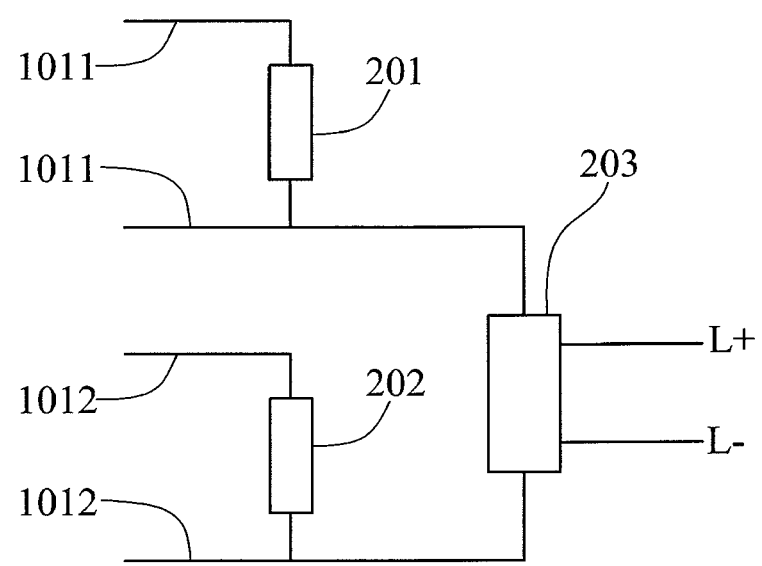
FIG. 2 is a block diagram illustrating a power transformation apparatus between a DC power input for DC light elements and outputs of a ballast according to an exemplary embodiment of the present invention.

Please refer to FIG. 2; FIG. 2 is a block diagram illustrating a power transformation apparatus between the DC light element and the ballast according to an exemplary embodiment of the present invention. As shown in FIG. 2, the power transformation apparatus between the DC light element and the ballast includes: a first fluorescent emulation module 201, a second fluorescent emulation module 202, and a rectifier module 203; wherein the first fluorescent emulation module 201 has two input current terminals respectively electrically connecting an output terminal of a first set of AC output terminals 1011 of the ballast 101; in addition, the second fluorescent emulation module 202 has two input current terminals respectively electrically connecting an output terminal of a second set of AC output terminals 1012 of the ballast 101; two input terminals of the rectifier module 203 are electrically connecting respectively to any output terminal of the first set of AC output terminals 1011 and any output terminal of the second set of AC output terminals 1012 of the ballast 101, and then outputs a rectified DC, to supply to the DC light element 103 as a power source. However, please note that even if in this exemplary embodiment in FIG. 2 the two input terminals of the rectifier module 203 are electrically connecting to the output terminals at the down side of the first set of AC output terminals 1011 and at the down side of the second set of AC output terminals 1012 of the ballast 101 respectively, but it is not a restriction of the present invention; the rectifier module 203 is allowed to electrically connecting to any output terminal of the first set of AC output terminals 1011 and of the second set of AC output terminals 1012.

In addition, please note that, since the ballast 101 is designed for the negative-resistance characteristics of the conventional gas-discharge light source (e.g., fluorescent tube), and the AC power source output from the first set of AC output terminals 1011 and the second set of AC output terminals 1012 of the ballast 101 is not the required power source of the DC light element 103. Therefore, the first fluorescent emulation module 201 and the second fluorescent emulation module 202, are accomplished by an equivalent circuit simulation for emulating the electrical characteristics (the negative-resistance characteristics) of a gas-discharge light source (e.g., a fluorescent tube), and the rectifier module 203 is used for converting the AC power source outputted from the first set of AC output terminals 1011 and from the second set of AC output terminals 1012 into a rectified DC power source, for supplying to the DC light element 103 as a power source. In other words, from the view of the ballast 101, a load constructed by the power transformation apparatus 102 between the DC light element and the ballast, and the DC light element 103, has the same electrical characteristics as that of the conventional gas-discharge light source, the power transformation apparatus 102 between the DC light element and the ballast, and the DC light element 103 thereby can directly replace the conventional gas-discharge light source, and to be used in the existing lighting apparatus having the ballast, and the power transformation apparatus of the present invention can work with the various existing ballast successfully.

Figure 3:
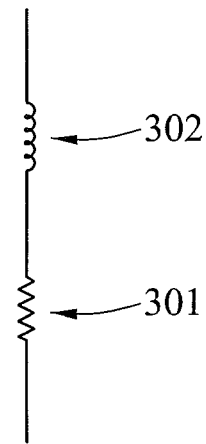
FIG. 3 is an exemplary embodiment of an equivalent circuit of the first fluorescent emulation module and the second fluorescent emulation module of the present invention.

Please refer to FIG. 3; FIG. 3 is an exemplary embodiment of an equivalent circuit of the first fluorescent emulation module and the second fluorescent emulation module of the present invention. As shown in FIG. 3, the first fluorescent emulation module and the second fluorescent emulation module can be formed by a resister 301, an inductor 302, or by a resister 301 in series with an inductor 302, with a characteristic of low-resistance. In this exemplary embodiment in FIG. 3, the circuit is formed by a resister 301 in series with an inductor 302, for emulating the specification of the electrical characteristics of the fluorescent tube. The fluorescent emulation modules emulate a filament electrode within a fluorescent tube. Hence, the first fluorescent emulation module and the second fluorescent emulation module can have the same specification of electrical characteristics.

The operating principles of the first fluorescent emulation module and the second fluorescent emulation module of the present invention are described as follows: the present invention using an electric module constructed by the resister 301 and the 302 (i.e., the first fluorescent emulation module 201 and the second fluorescent emulation module 202) to guide the output power source of the ballast, and originally inside the fluorescent tube the output power source of the ballast was utilized to start the fluorescent tube. For an electric ballast, the power source is a high frequency (usually 40K Hz, or is up to more than 50K Hz), high voltage (usually 300V, or is up to more than 600V) AC, and the high-frequency, high-voltage AC must be guided to the load directly. When the LED load of an exemplary embodiment of the present invention is used to replace the original load within the fluorescent tube, the aforementioned electric modules are used to guide the four output terminals (four lines) of the ballast corresponding to the two input terminals (four lines) of the fluorescent tube, and then each of the two terminals of the fluorescent emulation module 201 or 202 are used to respectively guide a line, to turn the four-line structure into a two-line structure, then the two-line structure(at this time upon the two lines is a high-frequency high-voltage AC power source) is guided into a bridge rectifier as a DC power source (e.g., as shown in L+,L− in FIG. 3) of the LED load. Herein the electric module of the resister and the inductor has a low resistance value, and the resistance value is about or less than 1 ohm. Since the characteristic of the low resistance value of the electric module constructed by the resister and the inductor, the present invention can also be applied into other types/structures of ballast, such as, be applied to the electric ballast with only three output terminals; when the electric ballast with three output terminals is used, usually the two pins of any one of the two terminals of the fluorescent tube will be short connected individually and is paralleled with another tube.

Figure 4:
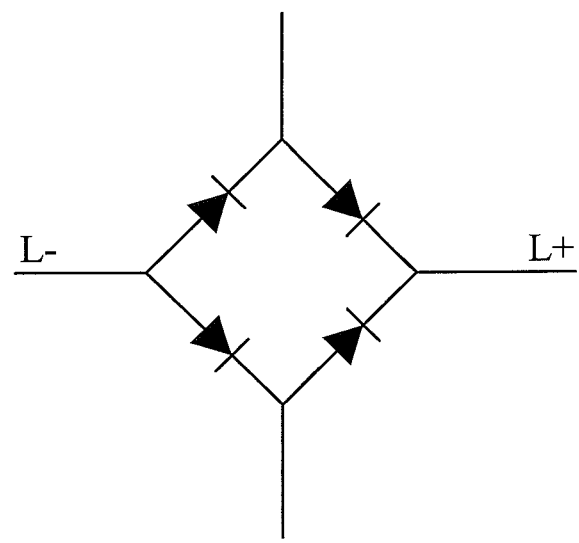
FIG. 4 is a diagram illustrating an exemplary embodiment of the rectifier module of the present invention.

Please refer to FIG. 4; FIG. 4 is a diagram illustrating an exemplary embodiment of the rectifier module of the present invention. As shown in FIG. 4; the rectifier module of the present invention can be realized by a bridge full-wave rectifier, the bridge full-wave rectifier is formed by four rectifier diodes in a bridge arrangement. Two input terminals of the bridge full-wave rectifier is respectively electrical connecting to any terminal of the first fluorescent emulation module and any terminal of the second fluorescent emulation module. Please note that, at this time, the AC power source outputted from any terminal of the first fluorescent emulation module and of the second fluorescent emulation module is a high-frequency high-voltage AC power source. Since the two terminals of the first fluorescent emulation module and of the second fluorescent emulation module respectively connected to the output terminals of the first set of AC output terminals and the second set of AC output terminals of the ballast 101; thus the two input terminals of the bridge full-wave rectifier are equal to be connected to any output terminal of the fluorescent emulation module 201, that is the first set of AC output terminals 1011 of the ballast 101 and to any output terminal of the fluorescent emulation module 202, that is the second set of AC output terminals 1012 of the ballast 101, for converting the AC from the ballast 101 into the DC for the usage of the DC light element 103.

Comparing the aforementioned exemplary embodiments of the present invention with the conventional techniques, the present invention is with the following advantages:

1. the present invention can be used to replace the conventional fluorescent tube, and the apparatus disclosed in the present invention can be directly applied to the existing lighting apparatus with the ballast, to avoid the cost of building a whole new lighting apparatus;

2. The apparatus disclosed in the present invention has advantages of a simple structure, low product cost, and high market competitiveness.

In short, by the disclosure of the features of the power transformation apparatus between the DC light element and ballast of the present invention, the expected purposes and effectiveness can be achieved, in line with the novelty, non-obviousness, and utility of invention patent.

Those skilled in the art will readily observe that numerous modifications and alterations of the device and method may be made while retaining the teachings of the invention. Accordingly, the above disclosure should be construed as limited only by the meters and bounds of the appended claims.

What is claimed is:

1. A power transformation apparatus, for being positioned between a DC light element and a ballast, the power transformation apparatus comprising:
  a first fluorescent emulation module, having two input current terminals, for respectively electrically connecting an output terminal of a first set of AC output terminals of the ballast;
  a second fluorescent emulation module; having two input current terminals, for respectively electrically connecting to an output terminal of a second set of AC output terminals of the ballast; and
  a rectifier module, having two input terminals, the two input terminals are electrically connected respectively to any input current terminal of the first fluorescent emulation module and any input current terminal of the second fluorescent emulation module, and outputting a rectified DC, to supply to the DC light element as a power source;
  wherein the first fluorescent emulation module and the second fluorescent emulation module, are accomplished by an equivalent circuit simulation for emulating electrical characteristics of a gas-discharge light source, for meeting negative-resistance characteristics of the gas-discharge light source.

2. The power transformation apparatus of claim 1, wherein the first fluorescent emulation module and the second fluorescent emulation module emulates an equivalent circuit simulation of a filament electrode formed by a resister, an inductor, or by a resister in series with an inductor, with a characteristic of low-resistance.

3. The power transformation apparatus of claim 1, wherein the equivalent circuit simulation of the first fluorescent emulation module and second fluorescent emulation module emulates a filament electrode within a fluorescent tube, and the first fluorescent emulation module and the second fluorescent emulation module have the same specification of electrical characteristics.

4. The power transformation apparatus of claim 1, wherein the equivalent circuit simulation of the first fluorescent emulation module and the second fluorescent emulation module emulates a filament electrode within a fluorescent tube, and the first fluorescent emulation module and the second fluorescent emulation module have different specifications of electrical characteristics.

5. The power transformation apparatus of claim 4, wherein the power transformation apparatus is in series with a load formed by the DC light element, to show the electrical characteristics the same as the fluorescent tube to the ballast.

6. The power transformation apparatus of claim 1, wherein DC light element is a LED light source.

7. The power transformation apparatus of claim 1, wherein the power transformation apparatus guides the four output terminals of the ballast into the two output terminals of the first fluorescent emulation module and the second fluorescent emulation module, and guides the two output terminals to the rectifier module for rectifying the two output terminals to a DC power source.

8. The power transformation apparatus of claim 7, wherein on the two output terminals is a high-frequency high-voltage AC power source.

9. The power transformation apparatus of claim 1, wherein the rectifier module is a bridge full-wave rectifier, the bridge full-wave rectifier is formed by four rectifier diodes in a bridge arrangement, the rectifier diodes have electrical characteristics of a low on-state resistance value and a low turn-on voltage.

* * * * *